(12) United States Patent
Scheucher

(10) Patent No.: US 8,196,959 B2
(45) Date of Patent: Jun. 12, 2012

(54) MOTOR VEHICLE WITH CONNECTION ELEMENTS BETWEEN A CHASSIS FRAME AND A VEHICLE BODY HAVING A CHANGEABLE TRANSVERSE RIGIDITY

(75) Inventor: Klaus-Peter Scheucher, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/190,249

(22) Filed: Jul. 25, 2011

(65) Prior Publication Data
US 2011/0278829 A1  Nov. 17, 2011

Related U.S. Application Data

(63) Continuation of application No. PCT/EP2010/002074, filed on Mar. 31, 2010.

(30) Foreign Application Priority Data

Apr. 9, 2009 (DE) .......................... 10 2009 017 193

(51) Int. Cl.
*B62D 21/00* (2006.01)
(52) U.S. Cl. ....................................................... 280/781
(58) Field of Classification Search .................. 280/781, 280/785, 786, 788, 124.103, 124.116, 124.121
See application file for complete search history.

(56) References Cited

U.S. PATENT DOCUMENTS

| | | | |
|---|---|---|---|
| 4,706,989 A | 11/1987 | Iijima et al. | |
| 6,880,856 B2 * | 4/2005 | Chernoff et al. | 280/781 |
| 6,935,658 B2 * | 8/2005 | Chernoff et al. | 280/781 |

FOREIGN PATENT DOCUMENTS

| | | |
|---|---|---|
| DE | 36 19 755 A1 | 12/1986 |
| DE | 37 03 618 A1 | 8/1988 |
| DE | 100 26 562 A1 | 12/2001 |
| DE | 103 51 574 A1 | 6/2005 |
| DE | 10 2004 006 582 A1 | 8/2005 |
| EP | 0 868 338 A1 | 10/1998 |
| EP | 0 868 338 B1 | 6/1999 |

OTHER PUBLICATIONS

German Search Report dated Apr. 13, 2010 including partial English-language translation (Nine (9) pages).
International Search Report dated Jun. 23, 2010 including English-language translation (Four (4) pages).

* cited by examiner

*Primary Examiner* — Faye M. Fleming
(74) *Attorney, Agent, or Firm* — Crowell & Moring LLP

(57) ABSTRACT

A motor vehicle having a chassis frame and a vehicle body has switchable connection elements between the chassis frame and the vehicle body. The connection elements are arranged both in front of and behind the connection line of the wheel contact points of the front wheels and/or the connection line of the wheel contact points of the rear wheels. As a result, during cornering, the vehicle body exercises a bending moment upon the chassis frame, which results in a self-steering behavior of the front axle and/or of the rear axle. This self-steering behavior can be influenced in that either the connection elements in front of or the connection elements behind the corresponding axle are triggered such that they exhibit a transverse rigidity that is as high as possible. While the respective other connection elements are triggered such that they exhibit a transverse rigidity that is as low as possible. The triggering takes place by way of a control unit which, for example, uses parameters from the driving operation of the motor vehicle as control variables.

15 Claims, 4 Drawing Sheets

MOTOR VEHICLE WITH CONNECTION ELEMENTS BETWEEN A CHASSIS FRAME AND A VEHICLE BODY HAVING A CHANGEABLE TRANSVERSE RIGIDITY

CROSS-REFERENCE TO RELATED APPLICATIONS

This application is a continuation of PCT International Application No. PCT/EP2010/002074, filed Mar. 31, 2010, which claims priority under 35 U.S.C. §119 from German Patent Application No. DE 10 2009 017 193.2, filed Apr. 9, 2009, the entire disclosures of which are herein expressly incorporated by reference.

BACKGROUND AND SUMMARY OF THE INVENTION

The invention relates to a motor vehicle having a chassis frame and a vehicle body. The chassis frame accommodates the chassis having a front axle and a rear axle. The vehicle body is connected with the chassis frame by way of connection elements.

A motor vehicle of the above-described type is disclosed in EP 0 868 338 B1. However, information on how a self-steering behavior of the known motor vehicle can be influenced is not provided in EP 0 868 338 B1.

It is an object of the invention to further develop the known motor vehicle such that a self-steering behavior of the motor vehicle can be influenced.

This and other objects are achieved by a motor vehicle according to the invention having a chassis frame and a vehicle body. The chassis frame accommodates the chassis having a front axle and a rear axle. The vehicle body is connected with the chassis frame by way of connection elements. The connection elements—viewed in the longitudinal direction of the vehicle—are arranged at a distance from a connection line of the wheel contact points of the wheels of the front and/or rear axle. Viewed in the longitudinal direction of the vehicle, in front of as well as behind the corresponding connection line of the wheel contact points (in each case at least one connection element is provided at the front axle and/or at the rear axle), the transverse rigidity of the connection elements are variable.

A process for influencing the self-steering behavior of the motor vehicle according to the invention changes the transverse rigidity of the at least one connection element in front of and behind the corresponding connection line of the wheel contact points such that (a) in a first adjustment, the at least one connection element in front of the connection line of the wheel contact points has a very high transverse rigidity, and the at least one connection element behind the connection line of the wheel contact points has a very low transverse rigidity, and (b) in a second adjustment, the at least one connection element in front of the connection line of the wheel contact points has a very low transverse rigidity, and the at least one connection element behind the connection line of the wheel contact points has a very high transverse rigidity.

As a result of the distance of the connection elements from the connection line of the wheel contact points of the wheels of an axle, a lever arm is created which, during cornering, causes a deformation of the chassis frame in the sense of a slight bending in a plane parallel to the road. The self-steering behavior of the motor vehicle is influenced by the deformation of the chassis frame and the accompanying reaction with respect to the front and/or rear axle of the motor vehicle. In the case of the motor vehicle known from EP 0 868 338 B1, the self-steering behavior is fixedly predefined by the position of the connection elements. A change of the self-steering behavior is therefore not possible.

According to the invention, at least one connection element in front of as well as behind the connection line of the wheel contact points of the front wheels and/or of the rear wheels is provided, in which case the connection elements can in each case be changed in their transverse rigidity. As a result, the connection point between the vehicle body and the chassis frame can be quasi-displaced, so that the lever arm for the application of the centrifugal force introduced by the vehicle body will change and the self-steering behavior of the motor vehicle can thereby be influenced.

The connection elements are preferably constructed to be switchable between the "very high transverse rigidity" and the "very low transverse rigidity" conditions. As a result, a back-and-forth switching can take place at the corresponding axle between a position of the at least one connection element in front of or behind the connection line of the wheel contact points, with a corresponding effect on the self-steering behavior.

If connection elements with a changeable transverse rigidity are provided at the front axle as well as the rear axle of the vehicle, preferably these being connection elements where a switching over can take place between the "very high transverse rigidity" and the "very low transverse rigidity" conditions, it becomes possible to influence the self-steering behavior in a very complex manner.

For influencing the self-steering behavior, the transverse rigidity of the connection elements is of decisive significance.

The connection elements preferably not only have the task of transmitting transverse forces but also of transmitting longitudinal and/or vertical forces. For this purpose, at the concerned axle, the at least one front connection element as well as the at least one rear connection element is designed such that it alone is in each case capable of ensuring a connection between the vehicle body and the chassis frame that is functionally perfect in all operating positions of the motor vehicle. In an advantageous embodiment of the invention, the connection elements may be constructed such that, in addition to the transverse rigidity, by way of a corresponding triggering of the connection elements, a change of the longitudinal and/or vertical rigidity is also achieved. As a result, for example, the driving comfort (tread comfort) can be influenced.

As an alternative, different groups of connection elements may be provided for the transmission of horizontal forces (particularly transverse forces), on the one hand, and vertical forces, on the other hand. By means of such a constructional separation, it becomes possible to influence the self-steering behavior of the motor vehicle by use of only one connection element respectively in front of and behind an axle, which connection element is variable in its transverse rigidity.

According to the above-indicated further developments of the invention, the connection elements are constructed as switchable elements which, as required, can be triggered in intermediate conditions.

In a preferred embodiment of the invention, the connection elements act without applying an active adjusting path and thereby quasi-operate without any path.

In an alternative further development of the invention, connection elements are used which can apply an adjusting path and/or an adjusting angle. By means of such "active" connection elements, for example, the yaw angle of the vehicle body can be influenced during a cornering of the motor vehicle such that the yaw angle of the vehicle body is smaller than the yaw angle of the chassis frame. This smaller "turning-in" of the vehicle body with respect to the chassis frame results in a particularly agile vehicle behavior, for example, during a slalom-type drive of the motor vehicle.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
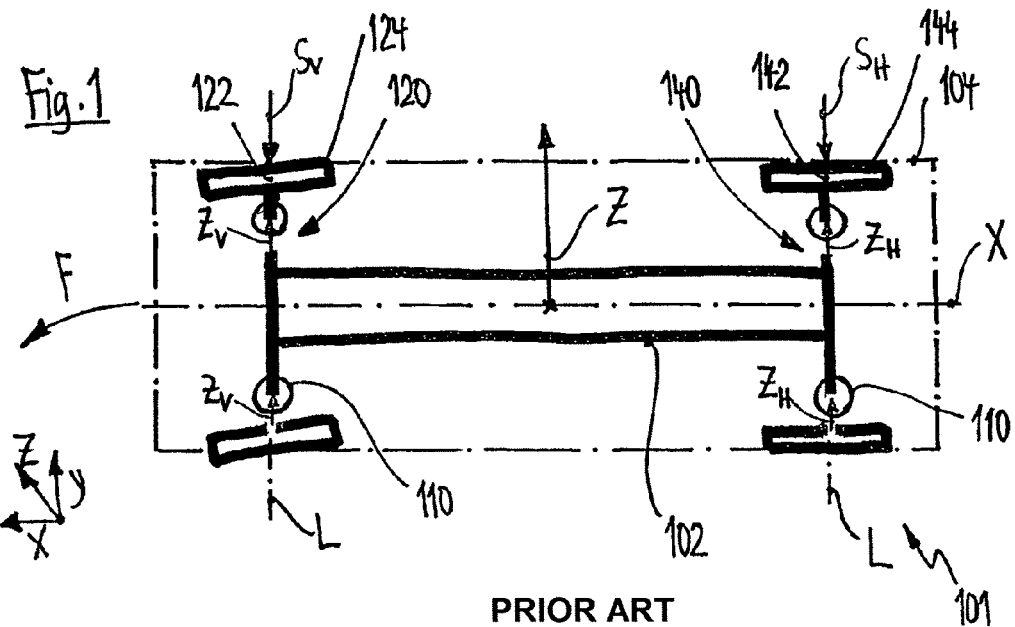
FIGS. 1 and 2 are schematic representations of known motor vehicles when cornering, and illustrate the effect of the forces occurring during the cornering on the self-steering behavior of the motor vehicle.

FIG. 1 illustrates a motor vehicle 101 according to the state of the art, as known, for example, from Austrian patent document AT 208 243 B. This vehicle, which is also known by the name of "Haflinger", has a chassis frame 102 and a vehicle body 104 (illustrated in dash-dotted lines). Two connection elements 110 are provided both at the front axle and at the rear axle 120 and 140 respectively and connect the chassis frame 102 with the vehicle body 104. The connection elements 110 are situated above the connection line L of the wheel contact points 122 of the front wheels 124 and above the connection line L of the wheel contact points 142 of the rear wheels 144 respectively and, in the direction of the longitudinal center axis X of the vehicle, are therefore not misaligned with respect to the connection lines L. The space coordinates are marked by an x (longitudinal vehicle direction), by a y (transverse vehicle direction) and by a z (vertical vehicle direction).

The forces occurring during cornering of the motor vehicle 101 are illustrated by the example of driving a left-hand turn according to the driving direction arrow F. The supporting forces $Z_V$ and $Z_H$ of the vehicle body 104, which result from the centrifugal force Z of the vehicle body 104, extend in a vertical transverse plane of the motor vehicle 101, which contains the connection lines L of the wheel contact points 122 of the front wheels 124 and the connection lines L of the wheel contact points 142 of the rear wheels 144 respectively. Accordingly, the supporting forces $Z_V$ and $Z_H$ act in the same vertical transverse plane yz in which also the lateral forces $S_V$ and $S_H$ respectively extend, which occur at the front wheels 124 and at the rear wheels 144 respectively. Since the vehicle body 104 therefore introduces no bending moments into the chassis frame 102, the motor vehicle 101 has a neutral driving behavior without any self-steering during cornering.

Figure 2:
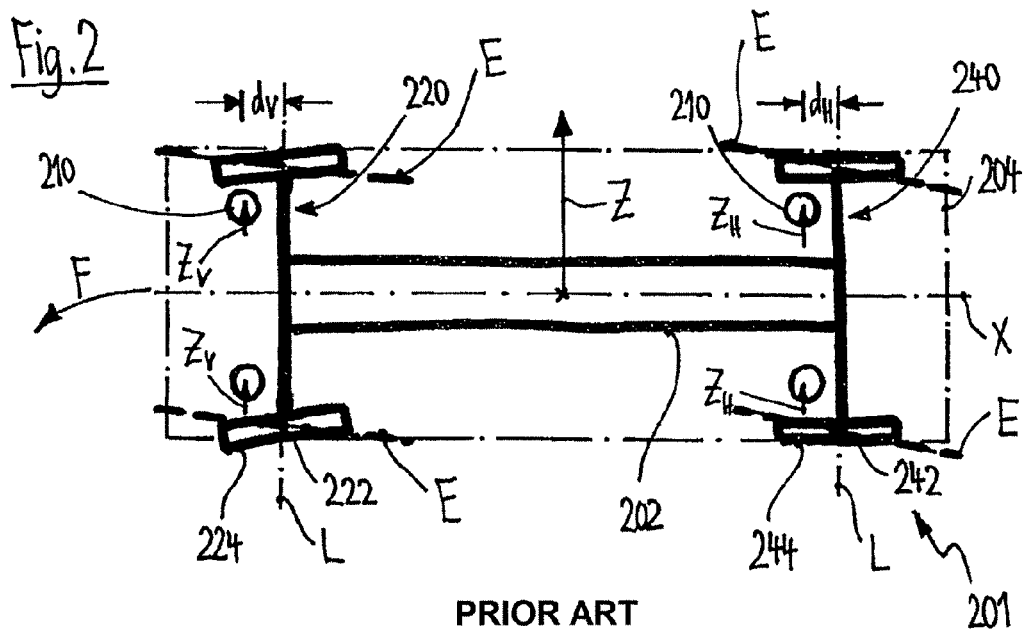

FIG. 2 illustrates a further motor vehicle 201 according to the state of the art, which is known from the initially mentioned European patent document EP 0 868 338 B1. In the case of the motor vehicle 201, the connection elements 210 between the chassis frame 202 and the vehicle body 204 are misaligned in the longitudinal direction x of the vehicle with respect to the connection lines L of the wheel contact points 222 of the front wheels 224 and the wheel contact points 242 of the rear wheels 244. Lever arms $d_V$ and $d_H$ are thereby created at the chassis frame 202 for the application of the supporting forces $Z_V$ and $Z_H$, which result from the centrifugal force Z of the vehicle body 204. The bending moments, which thereby act upon the chassis frame 202 during the cornering, lead to an elastic deformation of the chassis frame 202. Actually, the deformations caused by the bending moments are hardly perceptible in the case of a very rigidly constructed chassis frame. Nevertheless, the bending moments at least have the tendency to generate a self-steering behavior of the motor vehicle 201 because the elements of the front axle and the rear axle 220 and 240 respectively are moved along with the chassis frame 202. This is accompanied by a steering motion of the front wheels 224 and of the rear wheels 244, which is symbolized in FIG. 2 by very bold broken lines E.

Figure 3:
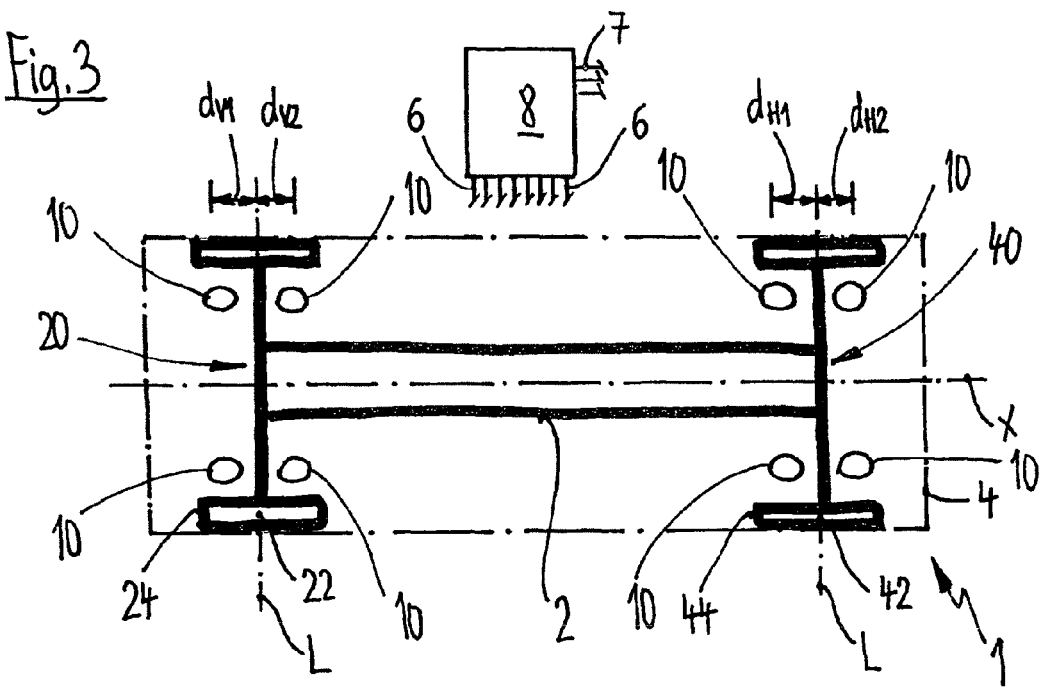
FIG. 3 is a schematic representation of an exemplary motor vehicle according to the invention.

FIG. 3 illustrates an exemplary motor vehicle 1 according to the invention having a chassis frame 2 and a vehicle body 4 in the non-operated state, while FIGS. 4 to 7 show the motor vehicle 1 while cornering. The chassis frame 2 accommodates a front axle 20 with the front wheels 24 and a rear axle 40 with the rear wheels 44. The linking of the vehicle body 4 to the chassis frame 2 takes place by way of a total of eight connection elements 10, which are arranged in pairs in front of and behind the connection line L of the wheel contact points 22 of the front wheels 24 and the connection line L of the wheel contact points 42 of the rear wheels 44 respectively. The misalignment of the connection elements 10 with respect to the connection lines L in the longitudinal vehicle direction x is marked $d_{V1}$ and $d_{V2}$ as well as $d_{H1}$ and $d_{H2}$. The connection elements 10 have a device for changing the transverse rigidity of the connection elements 10, which is not shown in detail. The devices for changing the transverse rigidity are triggered by way of control lines 6. The trigger logic is stored in a control unit 8. By way of inputs 7, signals, for example, from the driving operation of the motor vehicle 1, are fed to the control unit 8. Naturally, an automatic control unit, which takes account the signals of the connection elements 10, may be provided instead of the control unit 8.

The change of the transverse rigidity of the connection elements 10 preferably takes place in the sense of a switching between the "maximal transverse rigidity" and "minimal transverse rigidity" conditions. By switching between the "maximal transverse rigidity" condition and the "minimal transverse rigidity" condition, the corresponding connection element 10 is switched on and off with respect to the transmission of transverse forces. The connection elements 10 can thereby be activated or deactivated. Since the connection elements 10 are provided in pairs in front of and behind the axles 20 and 40 of the motor vehicle 1, by switching between the connection elements 10 in front of and behind an axle 20 and 40 respectively, different geometrical configurations of the connection can be generated between the chassis frame 2 and the vehicle body 4.

Figure 8:
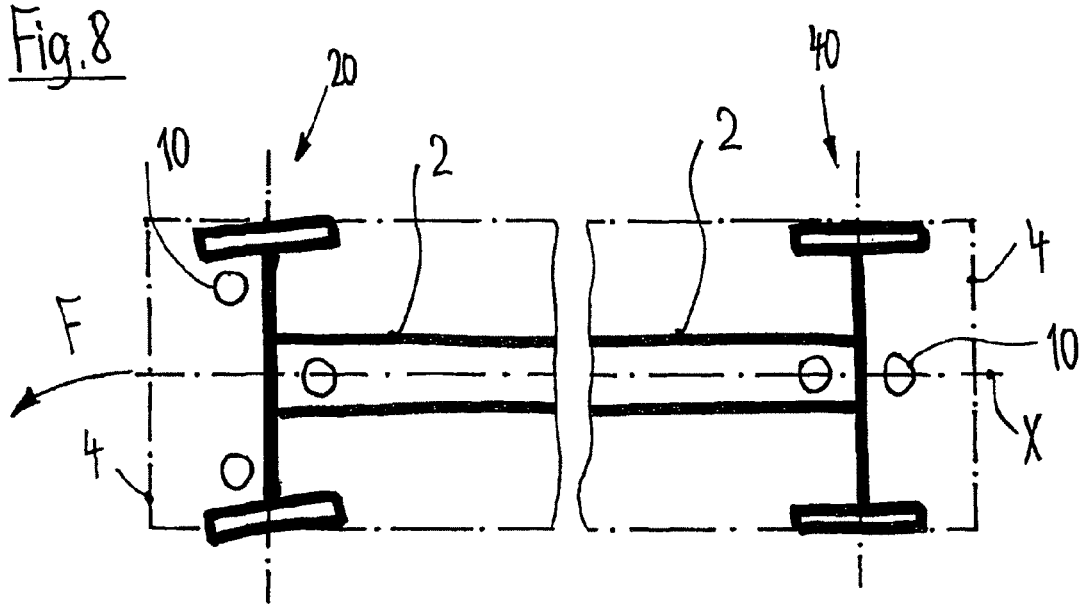
FIG. 8 is a schematic representation of an exemplary motor vehicle according to the invention with alternative arrangements of connection elements.

In the drawings of FIGS. 3 and 8, the connection elements 10 are illustrated in a neutral manner as circles.

In FIGS. 4 to 7, the connection elements in the "maximal transverse stiffness" condition are indicated by a cross in the circle, and the connection elements 10 in the "minimal transverse rigidity" condition are indicated by a dot in the circle.

In addition to the "maximal transverse rigidity" condition and the "minimal transverse rigidity" condition of the connection elements 10, intermediate stages can also be taken up. A continuous transition between the "maximal transverse stiffness" condition and the "minimal transverse stiffness condition" will make sense, for example, when it can be derived on the basis of data sensed from the driving operation of the motor vehicle 1 that a defined transition will take place into a different driving condition. As a result, an abrupt change of the driving behavior can be avoided with the advantage of an increased driving comfort. In addition, by triggering intermediate stages, a precise adjustment can take place in order to achieve a particularly high driving and acoustic comfort in certain driving conditions. Thus, for example, by reducing the rigidity in the connection elements 10, as required, not only in the transverse direction of the connection elements 10, in the case of straight-ahead driving, a high tread comfort with reduced tread noise can be achieved. On the other hand, as a result of a very high rigidity of the connection elements 10, particularly a high transverse rigidity, a "sporty tight" design is created.

The control unit 8 controls the connection elements 10 preferably as a function of parameters from the driving operation of the motor vehicle 1, for example, as a function of the speed, the steering angle, and/or the load of the motor vehicle 1. Naturally, parameters from the environment of the motor vehicle 1 (such as the temperature, the precipitation, the coefficient of friction of the road, etc.) can also be used for triggering. Likewise, the control unit 8 can take into account a condition desired by the driver of the motor vehicle 1 with respect to the self-steering behavior (within the limits of a sufficient directional control of the motor vehicle 1), such as a selection between the "sporty"—"neutral"—"comfortable" characteristics.

FIGS. 4 to 7 each show the basic course of the bending of the chassis frame 2, caused by the supporting forces of the vehicle body 4, by means of broken bending lines B. The deformations caused by the bending moments are actually hardly perceptible. The self-steering behavior of the motor vehicle 1 in each case generated because of the bending of the chassis frame 2 is indicated in FIGS. 4 to 7 by broken bold lines E (through the wheel centers 22 and 42).

Figure 4:
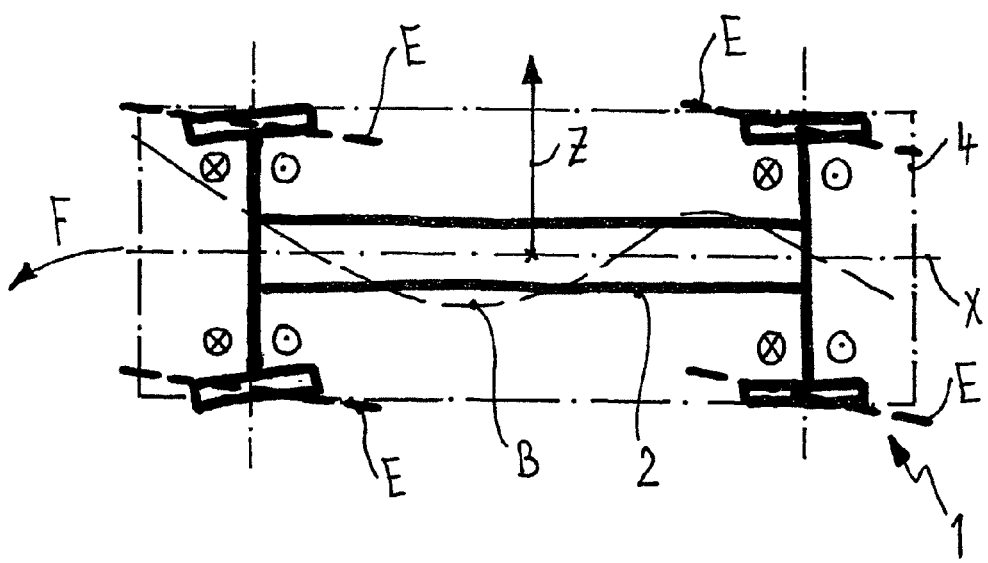
FIGS. 4 to 7 are representations of exemplary motor vehicles according to the invention.

The configuration according to FIG. 4 corresponds to an arrangement of the connection elements 10, as known from the state of the art according to FIG. 2. The self-steering behavior of the motor vehicle 1 generated according to FIG. 4, symbolized by the bold broken lines E, basically causes a stabilization of the motor vehicle 1 at higher speeds, in the sense of an "understeering correction".

Figure 5:
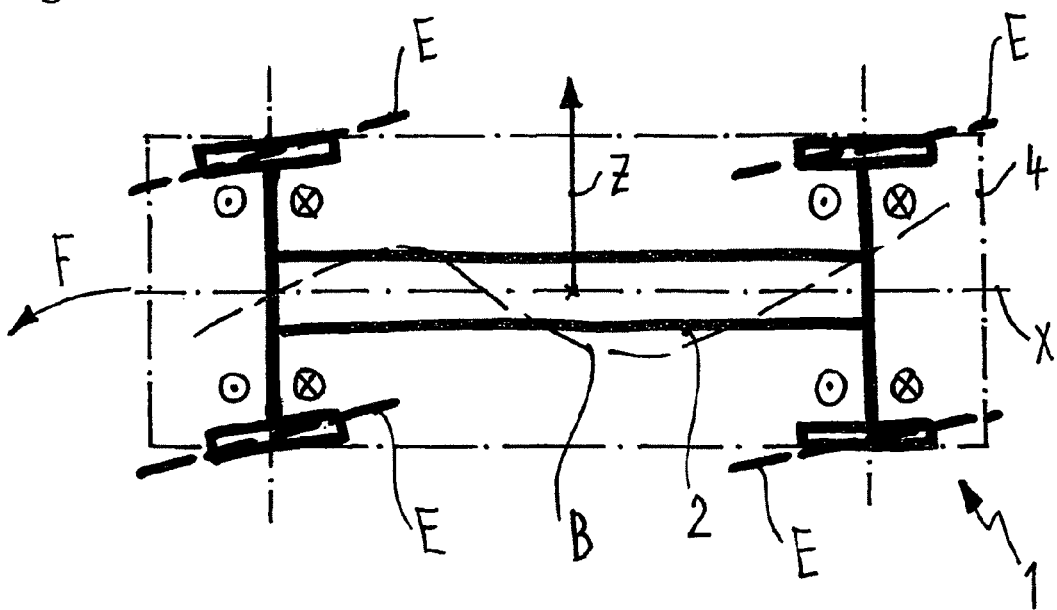

In the case of the configuration according to FIG. 5, the steering-in of the motor vehicle 1 is increased tendentially— and thus slightly changed in the "oversteering" direction, so that the steering behavior becomes more direct.

The triggerings according to FIGS. 4 and 5 (steering in the same direction at the front axle and at the rear axle) mainly but not exclusively are used at high driving speeds.

Figure 6:
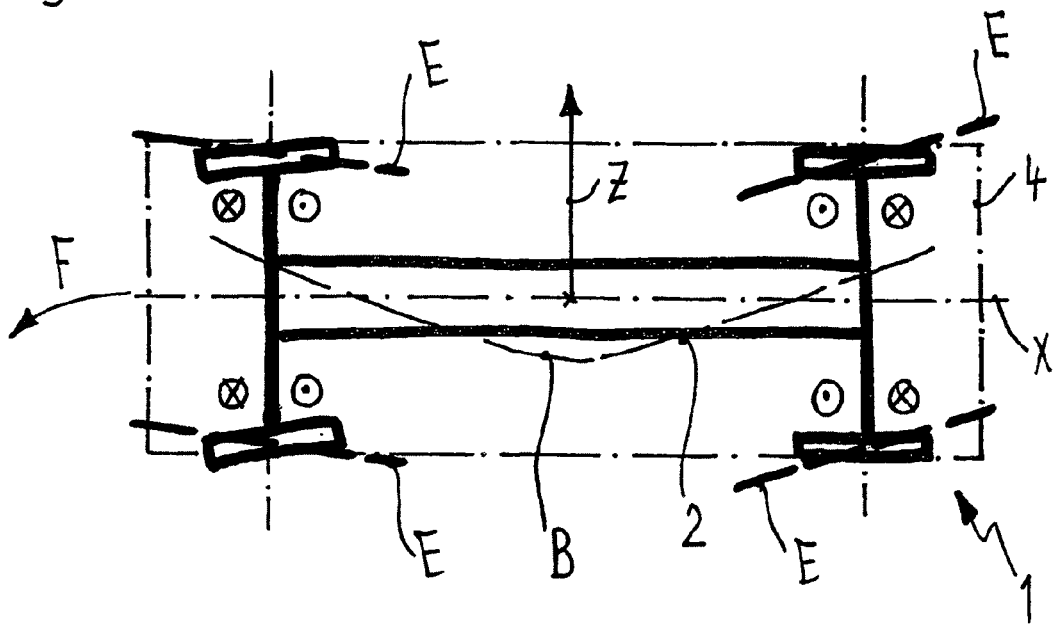
Figure 7:
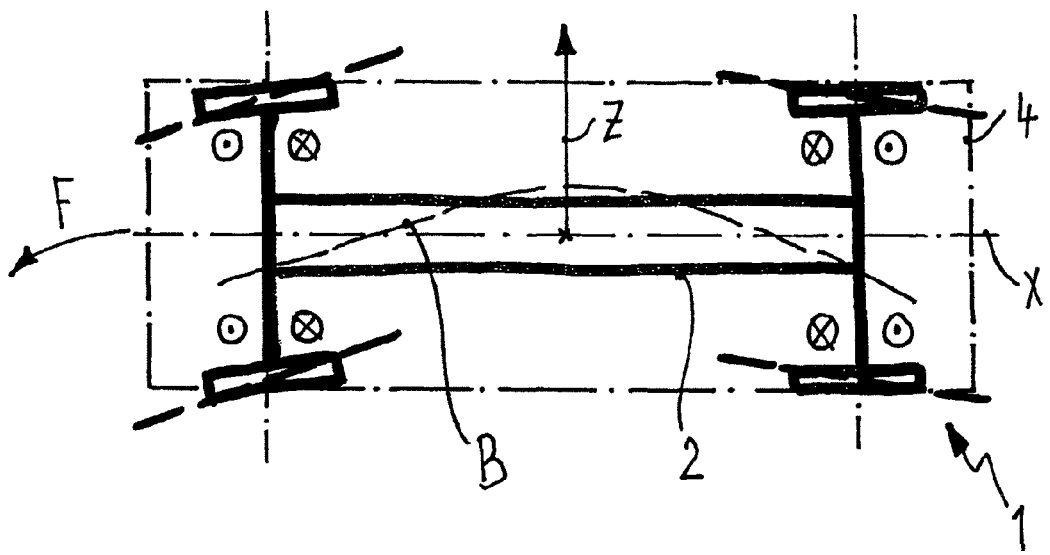

A triggering of the connection elements 10 according to FIG. 6 generates an understeering driving behavior, while an oversteering driving behavior of the motor vehicle 1 is achieved by a switching of the connection elements 10 according to FIG. 7.

The triggerings according to FIGS. 6 and 7 (steering at the front axle and at the rear axle in the opposite direction) mainly but not exclusively are used at lower to medium driving speeds.

It is a basic fact that, for a deformation of the chassis frame 2, as illustrated by means of the broken bending lines B in FIGS. 4 to 7, correspondingly high transverse forces have to be present from the driving dynamics of the motor vehicle 1; thus that a speed has to be present that is clearly above the maneuvering speed (driving into a parking space, etc.).

FIG. 8 shows additional possibilities of the arrangement of connection elements 10. These alternative arrangements require additional, not shown connection elements for the transmission of vertical forces (and possibly longitudinal forces) between the chassis frame 2 and the vehicle body 4. As a result of this division into two subassemblies of different connection elements between the chassis frame 2 and the vehicle body 4, a single connection element 10 in front of and behind the front axle 20 and/or the rear axle 40 is sufficient for transmitting the transverse forces (and possibility the longitudinal forces.

The left-hand part of the representation of FIG. 8 shows a three-point bearing by the example of a front axle 20, having two connection elements 10 in front of the front axle 20 and a single connection element 10 behind the front axle 20. Naturally, the three-point bearing may also be constructed with a single connection element 10 in front of and two connection elements behind the front axle 20. For an implementation of the three-point bearing at the front axle 20 as well as at the rear axle 40, a total of six connection elements 10 are required.

In the right-hand part of FIG. 8, a two-point bearing is illustrated by the example of the rear axle 40, having in each case one connection element 10 in front of and behind the rear axle 40. For an implementation of the two-point bearing at the front axle 20 as well as at the rear axle 40, a total of four connection elements are required.

In practice, the arrangement of connection elements 10 according to FIG. 8 in the longitudinal center axis X of the vehicle is difficult because of the space requirement of the transmission line (not shown).

Summarizing, the present invention can be described as follows. A motor vehicle 1 having a chassis frame 2 and a vehicle body 4 has switchable connection elements 10 between the chassis frame 2 and the vehicle body 4. The connection elements 10 are arranged both in front of as well as behind the connection line L of the wheel contact points 22 of the front wheels 24 and/or the connection line L of the wheel contact points 42 of the rear wheels 44. As a result, during a cornering, the vehicle body 4 exercises a bending moment upon the chassis frame 2, which results in a self-steering behavior of the front axle 20 and/or of the rear axle 40. This self-steering behavior can be influenced in that either the connection elements 10 in front of or the connection elements 10 behind the corresponding axle 20 and 40 are "activated"; thus, are triggered such that they have a transverse rigidity that is as high as possible. While the respective other connection elements 10 are "deactivated"; thus, are triggered such that they have a transverse rigidity that is as low as possible. The triggering takes place by way of a control unit 8 which, for example, uses parameters from the driving operation of the motor vehicle 1 as control variables.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A motor vehicle, comprising:
 a vehicle body;
 a chassis frame, the chassis frame having a front axle and a rear axle;
 connection elements operatively configured to connect the vehicle body with the chassis frame; and
 wherein, viewed in a longitudinal direction of the vehicle, at least one connection element is arranged, respectively, at a distance in front of and at a distance behind at least one of a first connection line that would extend between wheel contact points of the front axle wheels and a second connection line that would extend between wheel contact points of the rear axle wheels, a transverse rigidity of one or more of the connection elements being variable.

2. The motor vehicle according to claim 1, wherein the transverse rigidity of the one or more connection elements is variable between a very high transverse rigidity condition and a very low transverse rigidity condition.

3. The motor vehicle according to claim 1, wherein two connection elements, respectively, are provided in front of and behind, viewed in the longitudinal direction of the vehicle, a corresponding connection line of the front and/or rear axle wheels.

4. The motor vehicle according to claim 2, wherein two connection elements, respectively, are provided in front of and behind, viewed in the longitudinal direction of the vehicle, a corresponding connection line of the front and/or rear axle wheels.

5. The motor vehicle according to claim 1, wherein at least one connection element is operatively configured to carry out at least one of an adjusting path and an adjusting angle.

6. The motor vehicle according to claim 2, wherein at least one connection element is operatively configured to carry out at least one of an adjusting path and an adjusting angle.

7. The motor vehicle according to claim 3, wherein at least one connection element is operatively configured to carry out at least one of an adjusting path and an adjusting angle.

8. A process for influencing self-steering behavior of a motor vehicle having a chassis frame and a vehicle body, the chassis frame accommodating a front axle and a rear axle and the vehicle body being connected with the chassis frame via connection elements, the process comprising the acts of:
   providing at least one connection element, respectively, in front of and behind, viewed in a longitudinal direction of the vehicle, at least one corresponding connection line that would extend between wheel contact points of either the front axle wheels or the rear axle wheels; and
   changing a transverse rigidity of at least one of the connection elements provided in front of or behind the corresponding connection line.

9. The process according to claim 8, wherein the transverse rigidity of at least one connection element in front of and behind the corresponding connection line of the wheel contact points is changed such that:

(a) in a first adjustment, the at least one connection element in front of the connection line of the wheel contact points has a very high transverse rigidity, and the at least one connection element behind the connection line of the wheel contact points has a very low transverse rigidity; and (b) in a second adjustment, the at least one connection element in front of the connection line of the wheel contact points has a very low transverse rigidity, and the at least one connection element behind the connection line of the wheel contact points has a very high transverse rigidity.

10. The process according to claim 8, wherein the transverse rigidity of the one or more connection elements is changed as a function of at least one parameter from a driving operation of the motor vehicle.

11. The process according to claim 9, wherein the transverse rigidity of the one or more connection elements is changed as a function of at least one parameter from a driving operation of the motor vehicle.

12. The process according to claim 10, wherein the at least one parameter is at least one of a vehicle speed, a vehicle steering angle, and a load of the motor vehicle.

13. The process according to claim 11, wherein the at least one parameter is at least one of a vehicle speed, a vehicle steering angle, and a load of the motor vehicle.

14. The process according to claim 8, further comprising the act of:
   triggering a connection element to vary its transverse rigidity such that during cornering of the motor vehicle, the connection element generates a yaw angle at the vehicle body, said yaw angle being less than a yaw angle of the chassis frame.

15. The process according to claim 9, further comprising the act of:
   triggering a connection element to vary its transverse rigidity such that during cornering of the motor vehicle, the connection element generates a yaw angle at the vehicle body, said yaw angle being less than a yaw angle of the chassis frame.

* * * * *